United States Patent [19]

Mita et al.

[11] Patent Number: 5,349,159
[45] Date of Patent: Sep. 20, 1994

[54] CONSUMABLE-ELECTRODE AC GAS SHIELD ARC WELDING METHOD AND APPARATUS THEREFOR

[75] Inventors: Tsuneo Mita, Hiratsuka; Tsuneo Shinada, Yokosuka; Takayuki Kashima, Fujisawa, all of Japan

[73] Assignee: Hitachi Seiko, Ltd., Japan

[21] Appl. No.: 64,987

[22] Filed: May 24, 1993

Related U.S. Application Data

[62] Division of Ser. No. 556,096, Jul. 23, 1990, Pat. No. 5,225,660.

[30] Foreign Application Priority Data

| Jul. 21, 1989 | [JP] | Japan | 1-187377 |
| Apr. 17, 1990 | [JP] | Japan | 2-101401 |
| Apr. 17, 1990 | [JP] | Japan | 2-101402 |
| Apr. 17, 1990 | [JP] | Japan | 2-101403 |

[51] Int. Cl.$^5$ ............................................. B23K 9/09
[52] U.S. Cl. ........................... 219/137 PS; 219/130.51
[58] Field of Search ............ 219/130.4, 130.51, 137 PS

[56] References Cited

U.S. PATENT DOCUMENTS 3,803,382 4/1974 Tajbl et al. .................... 219/130.4
4,876,433 10/1989 Kashima et al. ............. 219/130.51

FOREIGN PATENT DOCUMENTS 63-281776 11/1988 Japan ............................. 219/130.4

Primary Examiner—Clifford C. Shaw
Attorney, Agent, or Firm—Venable, Baetjer, Howard & Civiletti

[57] ABSTRACT

A consumable electrode gas shielded AC arc welding method and an apparatus to practice the method applies alternating current across a consumable electrode and a base metal. During a first period, the electrode is positive and a current of a first level higher than a specified critical level is furnished. During a second period, the electrode is kept positive and current is reduced to a second level lower than the first level. During a third period, the electrode is kept negative at a third current level. These periods are periodically repeated. If during the frist period, the arc voltage drops below a predetermined voltage, current of a fourth level higher than the first level is furnished until the arc voltage exceeds the predetermined level.

4 Claims, 15 Drawing Sheets

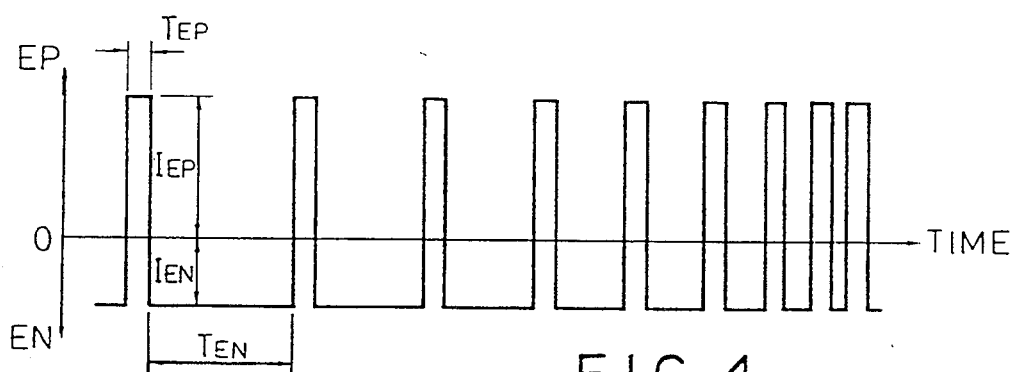
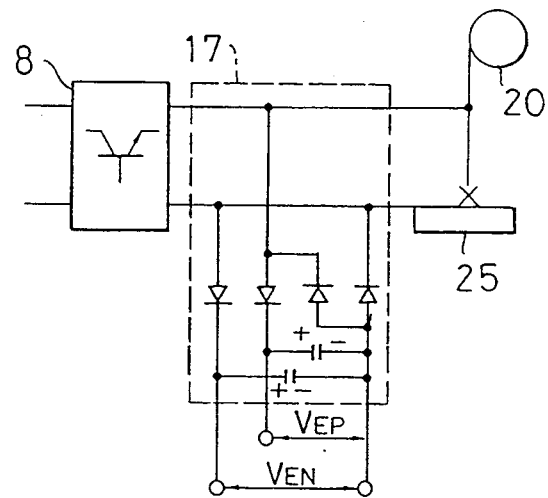
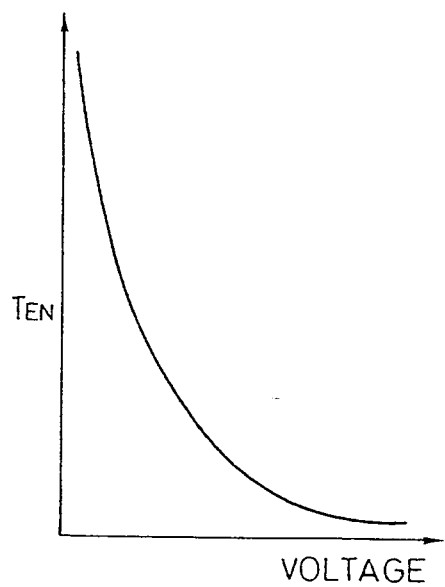
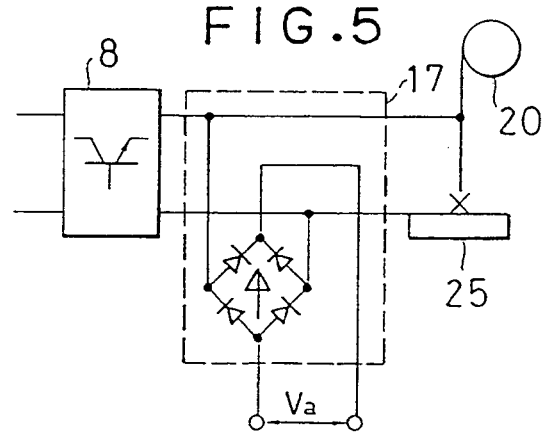

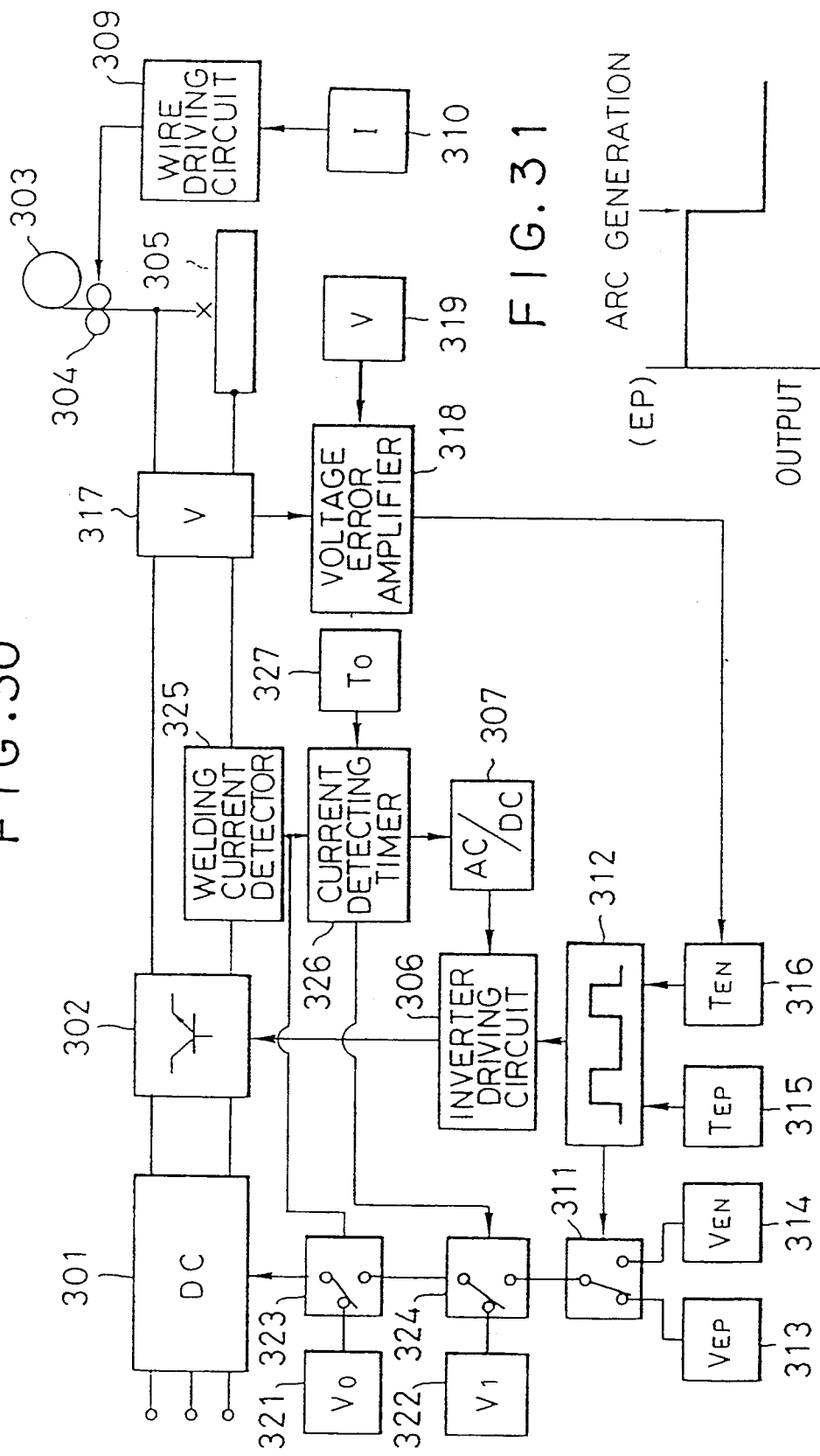

CONSUMABLE-ELECTRODE AC GAS SHIELD ARC WELDING METHOD AND APPARATUS THEREFOR

RELATED APPLICATION DATA

This application is a divisional patent application of Ser. No. 556,096 of Tsuneo Mita et al., entitled "Consumable-Electrode AC Gas Shield Arc Welding Method And Apparatus Therefor" which was filed in the U.S. Patent and Trademark Office on Jul. 23, 1990 now U.S. Pat. No. 5,225,660.

BACKGROUND OF THE INVENTION

1. Field of the Invention

The invention relates to arc welding, in particular to a consumable-electrode AC gas shield arc welding method and an apparatus therefor.

2. Description of the Related Art

Prior art teaches welding in which DC current: is passed through from an electrode (hereinafter referred to as wire) of positive polarity to a base metal of negative polarity in such a way that the average welding current may be controlled by varying the period of the base current while keeping its peak current, peak current period, and base current fixed, as disclosed in Japanese Patent Laid-Open Publication No. Sho. 56-165564. It is then possible to transfer the droplets formed at the tip of the wire towards the molten pool during the peak current period, thereby permitting welding which is less subject to spattering.

In order to obtain improved arc stability for small average welding current, Japanese Patent Laid-Open Publication No. Sho. 59-50672 discloses welding where a first electric pulse transfers the droplet from the wire and a second pulse prevents arc vanishing that follows the burning of the wire on the tip caused by the first pulse.

In a so-called reverse polarity welding where wire is given positive polarity and the base metal negative polarity, a substantially straight arc is established between the wire tip and a point of the surface (cathode spot) of the base metal just beneath the wire tip in the case of great welding current, while the cathode spot, and hence the arc itself, widely rambles on the surface of the base metal in the case of small welding current, so that the arc might vanish if it extends too long.

For these reasons the average welding current cannot be made smaller than a certain threshold in the said first prior art, nor said arc vanishing could not be prevented sufficiently in the said second prior art.

Japanese Patent Laid-Open Publication Sho. 57-130770 discloses a method for transferring the droplet to the molten pool in synchronism with the peak of the welding current which is passed through from a positive electrode (wire) to a negative base metal and is periodically varied between a maximum (peak current) and a minimum (base current).

For further understanding it would be appropriate to describe here a general relationship between the polarity of wire and the behaviors of arc. When the wire is given positive polarity, fairly immobile positive end of the arc is formed on the lower end of the droplet formed on the wire tip. As the result the arc is well bundled.

On the other hand if the wire is given negative polarity a diverging arc is formed from the droplet since mobile negative ends of the arc are then formed over the entire droplet surface. Therefore, when the polarity of the wire is changed from plus to minus, the arc pressure decreases as shown in FIG. 14 from curve a to curve b, so that the melting of the melting of the base metal is suppressed. However, if the wire is held minus only, much too large droplet is formed, since the amount of wire melt is governed by the polarity of the wire as depicted in FIG. 15, and hence the arc becomes unstable.

It should be noted that the use of AC current, permitting alternating polarities of plus and minus for the wire, may provide a stable arc configuration while suppressing melting of the base metal.

In a so-called reverse polarity welding where the wire is held positive and the base metal negative, the arc exhibits a greater pressure compared with positive polarity welding where the wire is held negative and the base metal positive, and consequently causes deeper penetration in the base metal and possible melting down of the metal if it is a thin metal plate. This is the case for metals like aluminum having low melting points.

In MIG braze welding using copper wire, excessive melting of the base metal must be avoided with great care since it causes the infiltration of copper into the base metal and results in weld cracks.

Suppression of the melting of the base metal is also desirable to reduce the dilution rate in the case of build-up welding of different metals.

In Japanese Patent Laid-Open Publication No. Hei. 1-186279 proposes a consumable electrode gas shield AC arc welding method and means therefor in which AC frequency is appropriately chosen for a given wire feeding rate, along with a period and a level of reverse polarity current suitable for the shield gas and the material properties and diameter of the wire used, and levels of the normal and reverse polarity currents are controlled based on the arc voltage detected to keep the arc length constant.

The prior art welding mentioned above, however, has drawbacks described below. The prior art welding assumes AC rectangular waves, which are not in actuality perfectly rectangular as shown by a dotted waveform in FIG. 21 but rather trapezoidal as shown by a solid waveform. This is due to the fact that in actual welding processes the inductances and resistances of a power supply cable, usually 10 to 20 m long, affect the waveforms. In FIG. 21 the coordinate and abscissa represent current and time, respectively. The figure shows that the arc polarity is straight when the welding wire is negative (EN), while the polarity is reverse when the welding wire is positive (EP). $I_{EP}$ is the level or height of the rectangular current wave in the reverse polarity; $T_{EP}$, its duration, while $I_{EN}$ is the height of the wave in the straight polarity; $T_{EN}$, its duration, where $I_{EP} > I_{EN}$ is assumed.

It is not possible with such trapezoidal waves to maintain AC current if the period $T_{EN}$ is shortened and the AC frequency is increased so as to meet the requirement of increasing wire feeding rate, since the time interval required for polarity change is not secured then, resulting in DC current as shown in FIG. 22. Furthermore, the period $T_{EN}$ will lose its constancy as the current changes from AC to DC, since the slopes of the trapezoidal wave are affected by the length and the arrangement of the welding cable used.

Furthermore, under a welding control method in which arc length is to be held constant as in prior art mentioned above, the current waveform changes as shown in FIGS. 23 and 24. Namely, if the arc length becomes shorter the electric current is increased to melt more wire so as to restore arc length and if the arc length becomes too long the current is decreased to melt less wire so as to restore the arc length, so that the amplitude of the current varies with the arc length. Consequently, AC Periods are eventually mingled with DC periods as shown in FIG. 25 as the period $T_{EN}$ of the wave having straight polarity is shortened.

Since AC and DC configurations are utterly different, coexistence of AC and DC arcs will result in fluctuations in penetration and melting of the wire, causing weld flaws such as overlaps and lack of fusion. Further, sudden change in arc configuration would upset welders and greatly reduce welding operability.

In non-consumable electrode AC gas shield arc welding as disclosed in Japanese Patent Laid-Open Publication No. Hei. 1-100672, a polarity EP (in which the electrode is negative) is maintained until an arc is initiated) but the current is switched from DC to AC immediately after the arc is initiated. This publication does not deal with welding whose arc is initiated by contacting the electrode on the base metal, since a high-frequency AC current is used in the non-consumable electrode AC welding method.

In a commercial consumable electrode DC gas shield arc welding apparatus an output power for arc initiation is set greater than that of normal operating output level.

Although such a consumable electrode DC welding as mentioned above deals with arc initiation with the consumable electrode in contact with the base metal, it is restricted to DC welding and no polarity switching is employed.

It should be noted that, because the penetration is smaller in EN polarity than in EP polarity, the switching of wire polarity from EP to EN immediately after the initiation of arc is likely to cause weld flaws and/or overlaps in the initiating arc region. Further, since the current is once reduced to zero and raised in opposite polarity, such polarity switching may destroy the initiating arc once and restart an arc, making an inherently unstable initiating arc more unstable.

SUMMARY OF THE INVENTION

The invention is directed to overcome these disadvantages mentioned above. Namely, a primary object of the invention is to provide a consumable electrode gas shield arc welding method and an apparatus therefor which is free of the rambling arc or undesirable arc vanishing even for a small welding current and may provide welding of high quality and improved welding operability.

Another object of the invention is to provide a consumable electrode gas shield arc welding method and an apparatus therefor with suppressed infiltration in the base metal, thereby yielding improved operability in low-melting-temperature metal welding and build-up welding.

Still another object of the invention is to provide a consumable electrode AC-DC gas shield arc welding apparatus which is operable with both AC and DC currents but precludes mingling of AC and DC currents, thereby yielding improved operability in welding.

A further objective of the invention is to provide a method for smoothly initiating a stablized arc.

These objectives involved in consumable electrode gas shield arc welding may be attained according to the invention by applying an AC power as shown in FIG. 1 across a wire and a base metal and the period $T_{EN}$ for which the wire is maintained negative is decreased/increased depending upon the wire feeding rate, under the conditions that the period $T_{EP}$ through which the wire is maintained positive, the level of the current $I_{EP}$ during $T_{EP}$, and the current level $I_{EN}$ during the period $T_{EN}$ are kept constant with $I_{EP}$ maintained higher than a specified critical output level and $I_{EN}$ lower than a specified critical output level.

During the period $T_{EP}$, current $I_{EP}$ is high, and the cathode spot of the arc is formed on the base metal practically right below the wire tip. As a result a practically straight arc is established between them. On the other hand during the period $T_{EN}$, the current is low. Nevertheless, the arc is also formed practically straight since the cathode spot of the arc is formed on the wire tip, thereby exhibiting no rambling or undesirable arc vanishing.

By varying the length of the period $T_{EN}$, the average welding current may be varied, and the droplets formed at the tip of the wire may be transferred to the melt pool in synchronism with the period $T_{EP}$.

In attaining the second objective above, the consumable electrode gas shield arc welding method according to the invention applies AC power across the consumable electrode and the base metal comprises a step of repeating periodically a sequence of first positive-electrode period through which a current of a first level higher than a specified critical current level is furnished, a second positive-electrode period in which the current of said first level is reduced to a second lower level, and a third negative-electrode period through a current is furnished at a third level with said consumable electrode held negative, and a step of furnishing a current of fourth level higher than said first level current until the arc voltage exceeds a predetermined level in case the arc voltage between said consumable electrode and the base metal drops below the predetermined level during said first positive-electrode period.

The negative-electrode period may be favorably decreased/increased depending upon the required wire feeding rate and preset arc voltages.

Also, the consumable electrode gas shield arc welding apparatus according to the invention comprises a DC power source, an output setting means for setting the output of said power source at least four different levels, a current control means for controlling said DC power source (by means of said output setting means), an inverter for converting the output of said DC power source to AC power, a period setting means connected with said inverter for setting the positive-electrode period and negative-electrode period, a period control means for providing said current control means and said inverter with periodic signals representative of said positive-and negative-electrode periods, a voltage detection means for detecting the arc voltage between said consumable electrode and the base metal, a switching means for selecting two of said four current levels which has been set by said output setting means based on the detected value of said voltage detection means.

FIG. 11 illustrates a characteristic of the output power used in the consumable electrode gas shield arc welding according to the invention. In applying AC output power across a consumable wire constituting an electrode and a base metal when the arc is in stable condition, the negative period $T_{EN}$ shown in FIG. 11 decreased/increased in correspondence with the decrement/increment in the wire feeding rate, under the condition that the following five parameters are maintained constant for given material properties and the sizes of the wire. These parameters are: a first period $T_{EP}$ through which the polarity of the wire is maintained positive; current $I_{EP}$ through the wire higher than a specified critical current (or minimum current at which a welding material transfer from the wire tip changes from droplet transfer to spray transfer) during said period $T_{EP}$; a second period $T_{ER}$ through which current is lowered from said $I_{EP}$ to a level $I_{ER}$ below said critical current; current level $I_{ER}$ that the current may be reduced to from $I_{EP}$ in steps or linearly; output current level $I_{EN}$ lower than the given critical current over $T_{EN}$ during which the wire polarity is maintained negative.

FIG. 12 show that, if the arc voltage becomes lower than the predetermined level V1, the level of the current is switched from said level $I_{EP}$ to a higher level $I_{EP}'$ until the arc voltage exceeds a predetermined voltage. The change from $I_{EP}$ to $I_{EP}'$ may be made in step as shown by a solid line or linearly as shown by a dotted line in FIG. 12.

Since the configuration of an arc is greatly affected by the polarity of the wire, it is necessary to set said $T_{ER}$ (i.e., the period required for decreasing the current) so that sudden change in arc configuration is avoided.

Since the electric resistances of aluminum and copper wires are smaller than that of iron, less Joule heat is generated with these metals. Therefore, in order to allow smooth arc initiation or stop a short circuiting caused by, for example external disturbance, regardless a drop of arc voltage below a predetermined level, a current greater than a normal output level must be furnished. In a consumable electrode gas shield arc welding apparatus according to the invention, the output setting means the output level of the DC power source at first through fourth levels $I_{EP}$, $I_{ER}$, $I_{EN}$ shown in FIG. 11, and $I_{EP}$ shown in FIG. 12, respectively. The period setting means sets a first and a second positive electrode period $T_{EP}$ and $T_{ER}$, respectively, shown in FIG. 11, and a negative electrode period $T_{EN}$. The period control means provides the current control means and the inverter with $T_{EP}$, $T_{ER}$ and $T_{EN}$ signals, upon which signals said current control means controls the output current of the DC power source and the current inverter converts said DC output to AC output. The switching means switches said set current output from $I_{EP}$ to $I_{EP}'$ as the measured arc voltage given by the voltage detection means drops below the predetermined level V. shown in FIG. 12.

In order to fulfill the third objective, the consumable electrode AC-DC gas shield arc welding apparatus comprises: a DC power source; an output setting means for setting the output of said power source at two (higher and lower) levels; a polarity inverter for converting the AC current from said DC power source to DC current, positive-negative polarity period setting means, connected with the polarity inverter, for setting a reverse polarity period for providing the higher level current and a negative polarity period for providing a lower level current; a welding current control means for controlling the level of the welding current i.e. the output consisting of the higher and lower levels by varying said positive polarity period; a synchronizing means for providing the output from the output current setting means in synchronism with the periods set by the positive-negative polarity period setting means; polarity fixing means for fixing the polarity at which said polarity inverter operates; a level setting means for setting the operating level of said polarity fixing means.

The current waveform output from a consumable electric AC-DC gas shield arc welding apparatus of the invention consists of two portions: one portion having a current level $I_{EP}$ and a reverse polarity period $T_{EP}$ during which the welding wire is held positive and another portion having current level $I_{EN}$ over a straight polarity period $T_{EN}$ during which the welding wire is held negative.

Keeping $I_{EP}$, $T_{EP}'$ and $I_{EN}$ constant, welding current (which is effective current) is controlled so that, when the rate of wire feeding is raised, the welding current is increased by decreasing $T_{EN}$ to increase the AC frequency but when the wire feeding rate is lowered, the welding current is decreased by increasing $T_{EN}$, where $I_{EP} > I_{EN}$.

When the welding current is increased and straight polarity period $T_{EN}$ becomes lower than a predetermined period To as shown in FIG. 16, reverse polarity is maintained without further inversion of the polarity of the welding wire. Namely, in a large-current region for which $T_{EN}$ is smaller than To, the welding apparatus is so controlled as to perform DC welding of reverse polarity.

Conversely, in a small-current region where the period $T_{EN}$ is longer than To, AC welding is performed. Thus, taking into account the influencing parameters such as the length of a cable used, the mode of the welding current is uniquely determined on either AC or DC, depending on its level. In other words, AC and DC modes are not mingled together irrespective of rising or falling of the current.

In a case where the arc length is controlled to be constant through feedback of the arc voltage across the welding wire and the base metal, switching of the current from AC to DC takes place at the point where the period $T_{EN}$ decreases to a predetermined period To when the arc voltage is rising, while the switching from DC to AC takes place at the point where the period $T_{EN}$ increases to To' greater than To when the arc voltage is descending as shown in FIG. 17. Therefore, AC current output is sustained to a higher level when AC welding is in operation, and DC current output is sustained to a lower level when DC welding is in operation, thereby greatly diminishing the mingling of AC and DC welding mode i.e. the discontinuity of arc configuration.

Regarding the fourth objective, the method of the invention for initiating an AC arc in AC gas shield arc welding is characterized in that the welding output is set greater than the normal outpost level before the ignition of the arc and over a predetermined period following the ignition, and that the polarity is switched only after the predetermined period when the arc configuration has become stable. The polarity is fixed thereafter at either EP or EN which is suitable for the purpose of the welding, and the output is switched down to the normal level after the predetermined period of time following the arc initiation.

The arc initiation may be performed with the wire or the consumable electrode kept at polarity EP and with the output set greater than the normal welding level.

BRIEF DESCRIPTION OF THE DRAWINGS

FIG. 1 shows an exemplary output characteristic of a consumable electrode gas shield arc welding method according to the invention;

FIG. 3 is a relationship between the voltage V and the period $T_{EN}$ of the first embodiment;

FIGS. 4 and 5 show a voltage detection circuit for use with the first embodiment;

FIGS. 29 and 30 illustrate block diagrams of AC gas shield arc welding apparatus employing the AC arc initiation methods shown in FIGS. 26 and 27, respectively, and;

FIG. 31 illustrates a prior art AC arc initiation method.

DESCRIPTION OF PREFERRED EMBODIMENTS

Figure 2:
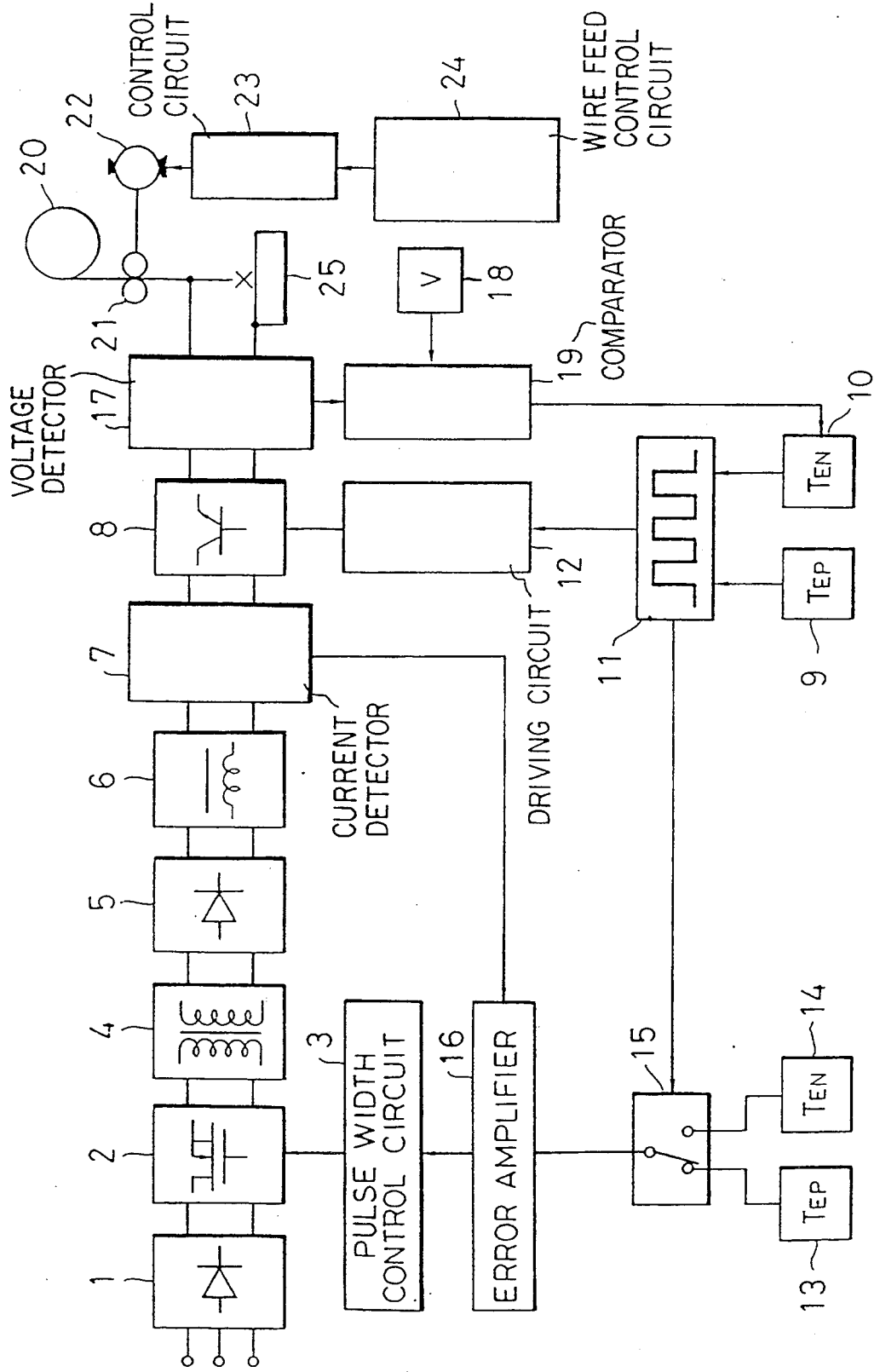
FIG. 2 illustrates a first welding apparatus embodying the invention.

FIG. 2 shows a first welding apparatus embodying the invention having an output characteristic shown in FIG. 1, comprising the components listed below.

An input rectifier 1 for rectifying alternating current having commercial frequency to direct current.

An MOS-FET type input inverter 2 for converting said direct current to high-frequency alternating current of about 20 KHz.

A pulse width control circuit 3 for controlling the pulse width of said high-frequency alternating current.

A welding transformer 4 whose input is connected with said input inverter.

An output rectifier 5 connected with the output of the welding transformer 4, for rectifying again said high-frequency alternating current to direct current.

A series reactor 6 for smoothing the DC output of the output rectifier 5.

A current detector 7.

An output inverter 8 for inverting DC to AC again for AC welding, said inverter 8 being controlled by a driving circuit 12 based on the signal from a period $T_{EP}$ setting means 9 and a rectangular-wave generator 11 which is set by period $T_{EN}$ setting means 10.

Current setting means 13 and 14 for setting the current $I_{EP}$ and $I_{EN}$ to be output from the output inverter 8.

A switching means 15 for connecting the current setting means 13 and 14 with the pulse width control circuit 3 via an error amplifier 16 in such a way that the current setting means 13 is synchronized with the period setting means 9 and the current setting means 14 is synchronized with the period $T_{EN}$ setting means 10, by a signal from the rectangular-wave generator 11, wherein the error amplifier 16 is also connected with the current detector 7 so that the current detected by the current detector 7 is compared with the current $I_{EP}$ and $I_{EN}$ set by the current setting means 13 and 14, respectively, to control the pulse width control circuit 3 in such a way that the average current passing through the current detector 7 matches the current $I_{EP}$ and $I_{EN}$ during welding. In other words, the error amplifier 16 controls the pulse width control unit 3 so as to make constant the output current level of the output inverter 8.

A voltage detection circuit 17 connected with the output of the output inverter 8.

A voltage setting means 18, connected with the period $T_{EN}$ setting means 10 via a comparator 19, for setting up the voltage V required for welding, wherein the setting up of voltage V causes the period $T_{EN}$ setting means 10 to set up a corresponding period $T_{EN}$ which varies exponentially with V as shown in FIG. 3.

A comparator 19 for comparing the voltage detected by the voltage detection circuit 17 with the set voltage V during welding to thereby control the period $T_{EN}$ setting means 10 to match $T_{EN}$ with V.

A wire 20.

A roller 21 for feeding the wire 20.

A motor 22, which is controlled by a motor control circuit 23.

A wire feeding rate setting means 24, connected with the motor control circuit 23.

In the figure, base metal is indicated by 25.

FIGS. 4 and 5 illustrate an example of the voltage detection circuit 17 above. In particular, FIG. 4 shows one that is capable, from the peak charge waveform of a capacitor, of individually detecting the voltage $V_{EP}$ and $V_{EN}$ across the wire 20 and the base metal 25 during the period $T_{EP}$ and $T_{EN}$, respectively. FIG. 5 shows another example for detecting the average of $V_{EP}$ and $V_{EN}$.

The operation of the apparatus of the invention is now described below.

Prior to welding, current levels $I_{EP}$ and $I_{EN}$ are set by the current setting means 13 and 14, and period $T_{EP}$ by the period setting means. Also, voltage V is set by the voltage setting means 18 (which determines the period $T_{EN}$). Feeding rate of the wire 20 is set by the wire feeding rate setting means 24.

During welding a droplet formed at the tip of the wire 20 is synchronously transferred to the molten pool with the period $T_{EP}$. Even during the period $T_{EN}$ the arc is sustained and some droplets are formed. In both periods the arc is substantially straight.

When the voltage at the output terminal of the output inverter 8 is detected by the detection circuit 17 to be lower than the voltage set by the voltage setting means 18 due to, for example, elongation of the arc, the comparator 19 functions to make the period $T_{EN}$ longer than the set period $T_{EN}$ so as to decrease the amount of the wire melting away and restore the original arc length. On the other hand, when the arc becomes shorter the period $T_{EN}$ is made shorter to restore the original arc length, thereby maintaining constant arc length.

Table 1 shows exemplary data for AC welding with a metal flux cored wire having a diameter of 1.2 mm, a shield gas composed of 80% Ar plus 20% $CO_2$.

TABLE 1

| $I_{EP}$ [A] | $I_{EN}$ [A] | $T_{EP}$ [ms] | $T_{EN}$ [ms] | Wire Feeding Rate [m/min] |
|---|---|---|---|---|
| 270 | 70 | 5 | 80 | 4 |
|  |  |  | 10 | 6 |
|  |  |  | 3 | 7.5 |

Under the conditions above with current $I_{EP}$ and $I_{EN}$ kept constant as well as period $T_{EP}$, favorable welding was obtained by varying $T_{EN}$ for varied wire feeding rates.

Although a single voltage setting means 18 is used in this example, two voltage setting means 18 may be used in combination with voltage detection circuit 17 as shown in FIG. 4 capable of independently detecting $V_{EP}$ and $V_{EN}$.

In keeping constant the output terminal voltage, a control parameter is not limited to the period $T_{EN}$ but it may be any one of the period $T_{EP}$, current $I_{EP}$, and the current $I_{EN}$. Further, when both the voltage $V_{EP}$ and $V_{EN}$ are detected, the period $T_{EN}$ may well be controlled by $V_{EP}$, and $T_{EP}$ by $V_{EN}$.

Figure 6:
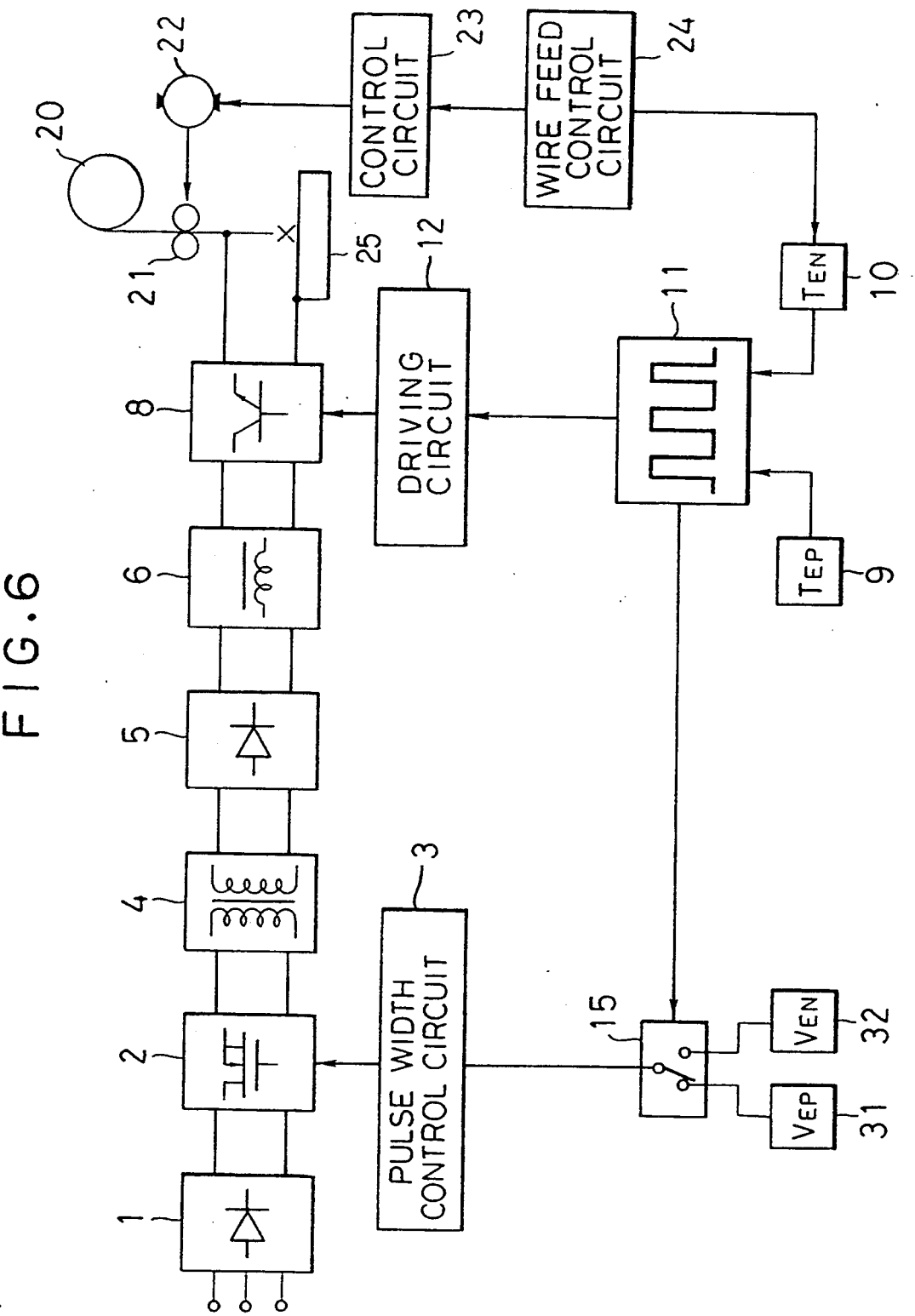
FIG. 6 is a second embodiment of the welding apparatus.

FIG. 6 shows a second example of the welding apparatus according to tile invention, Those components identical with ones shown in FIG. 2 are numbered the same in this figure, too.

Figure 7:
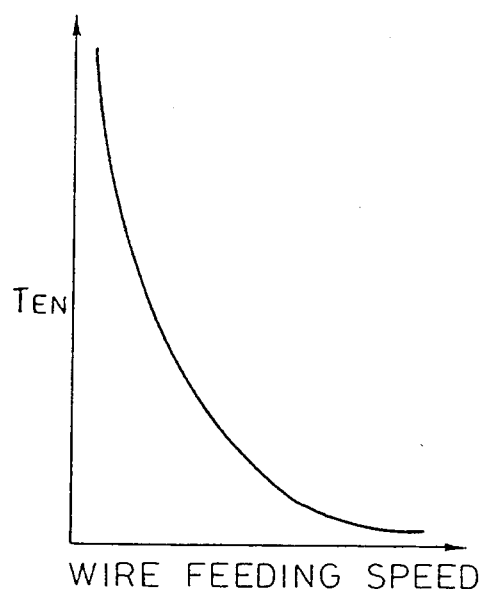
FIG. 7 shows a relationship between wire feeding rate and period $T_{EN}$.

In this example, voltage setting means 31 and 32 set the voltage $V_{EP}$ and $V_{EN}$ to be output from an output inverter 8. As shown in FIG. 7, given signals by a rectangular-wave generator 11, a switch 15 connects the voltage setting means 31 and 32 with a pulse width control circuit 3 in such a way that a voltage setting means 31 is in synchronism with a period $T_{EP}$ setting means 9, and a voltage setting means 32 in synchronism with a period $T_{EN}$ setting means 10. Namely, the output of the output inverter 8 is a constant voltage.

A wire feeding rate setting means 24 is connected with the period $T_{EN}$ setting means 10. As shown in FIG. 7, the period $T_{EN}$ varies approximately exponentially with wire feeding rate.

The operation of this example is as follows.

Prior to welding, voltages $V_{EP}$ and $V_{EN}$ are set by means of the voltage setting means 31 and 32, respectively; period $T_{EP}$ by means of the period $T_{EP}$ setting means 9; and wire feeding rate by means of the wire feeding rate setting means 24. As mentioned above, the period $T_{EN}$ is also set if the wire feeding rate is set.

Droplets formed during welding at the tip of a wire 20 are transferred to the molten pool in synchronism with the period $T_{EP}$, and even during the period $T_{EN}$ the arc maintained and a few droplets may be formed. In either period, the arc is practically straight.

The length of the arc is maintained substantially constant under a constant voltage characteristic of the input inverter 2.

Table 2 below shows data for exemplary AC welding with a mild steel solid wire having a diameter of 0.9 mm, a shield gas composed of 80% Ar plus 20% $CO_2$.

TABLE 2

| $I_{EP}$ [V] | $I_{EN}$ [V] | $T_{EP}$ [ms] | $T_{EN}$ [ms] | Wire Feeding Rate [m/min] |
|---|---|---|---|---|
| 32 | 20 | 6 | 30 | 5 |
|  |  |  | 10 | 8 |
|  |  |  | 1 | 13 |

Under the conditions above with voltage $V_{EP}$ and $V_{EN}$ kept constant as well as period $T_{EP}$, favorable welding was obtained by varying $T_{EN}$ for varied wire feeding rates.

Although in this example the period $T_{EN}$ is varied in accordance with the wire feeding rate by means of the wire feeding rate setting means 24 connected with the period $T_{EN}$ setting means 10, the period $T_{EN}$ may be set individually for each given wire feeding rate based on the data obtained from the relationship of FIG. 7 and stored in a form of a data sheet.

Figure 8:
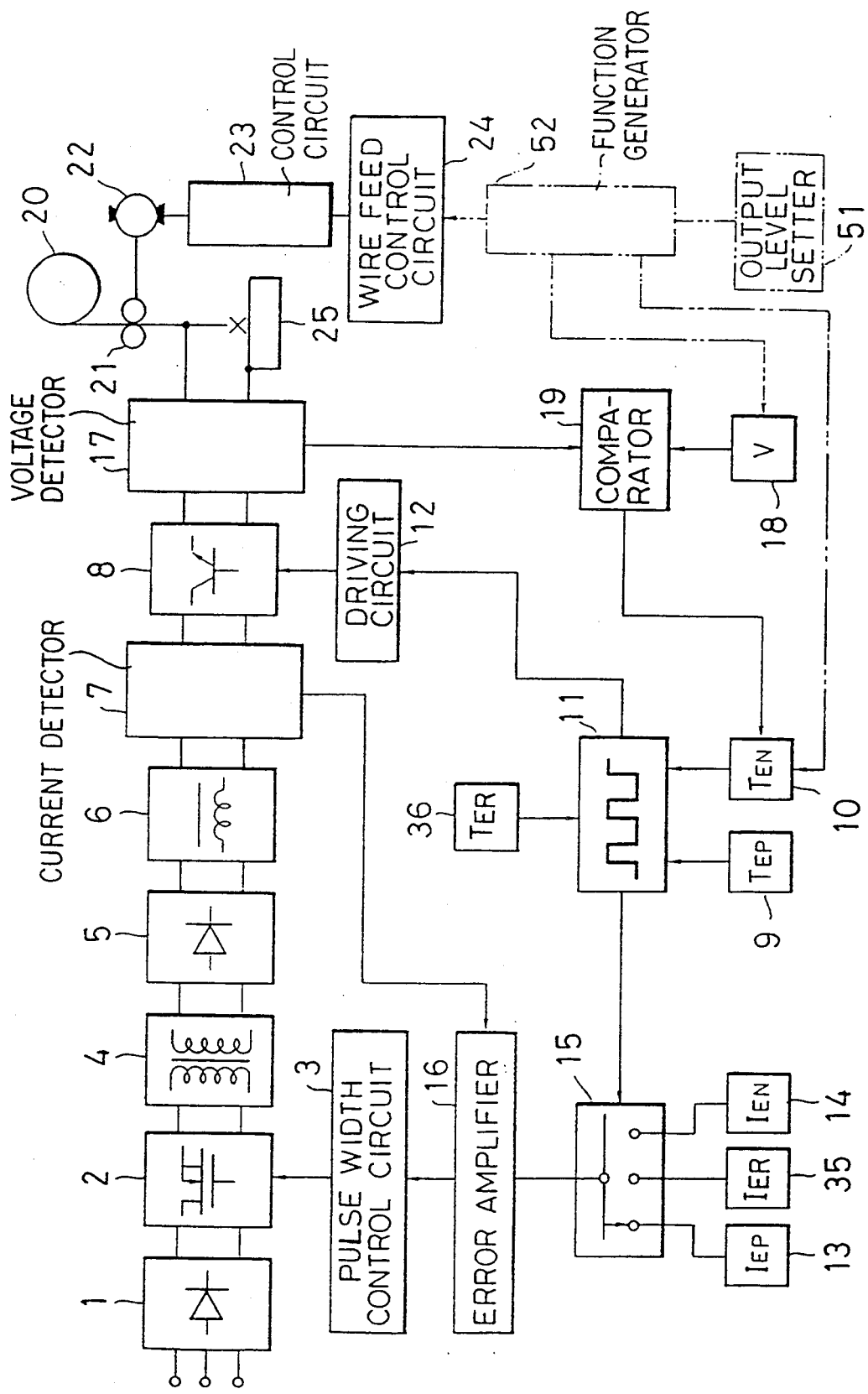
FIG. 8 is a third embodiment of the welding apparatus.

FIG. 8 shows a third example of the welding apparatus according to the invention. Those components identical with ones shown in FIG. 2 are numbered the same in this Figure, too.

Figure 9:
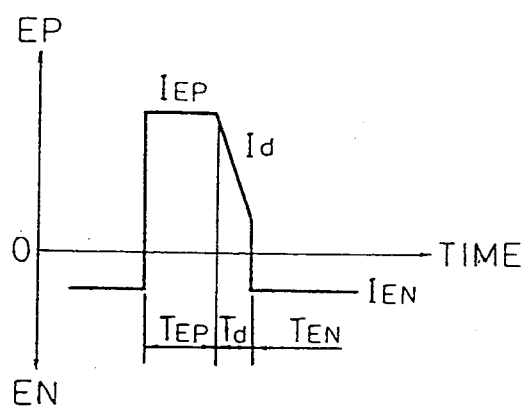
FIG. 9 and 10 show the characteristic of a third embodiment.
Figure 10:
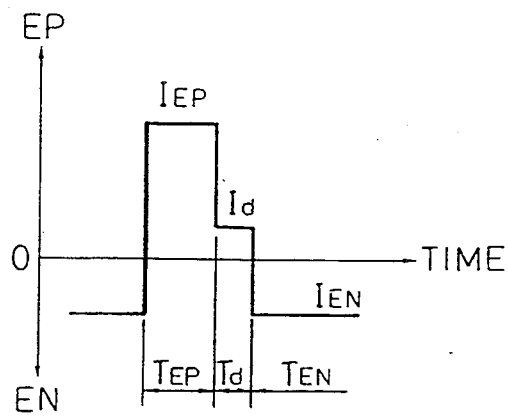

In this example a current setting means 35 sets the current $I_{ER}$ to be output from an output inverter 8. As shown in FIGS. 9 and 10, current $I_{ER}$ flows decreasingly from $I_{EP}$ to a lower level only for a period $T_{ER}$ determined by a period $T_{ER}$ setting means 36 (during which the wire is maintained positive).

A switch 37 is adapted to synchronize a current setting means 13 with the period $T_{EP}$ setting means 9, and a current setting means 14 with a period $I_{EN}$ setting means 10.

The operation of this example is as follows.

Prior to welding, currents $I_{EP}$, $I_{ER}$, $I_{EN}$ are set by means of the current setting means 13, 35 and 14, respectively; period $T_{EP}$ and $T_{ER}$ by means of the period $T_{EP}$ setting means 9 and the period $T_{ER}$ setting means 36, respectively; voltage V by means of the voltage setting means 18; and wire feeding rate by means of the wire feeding rate setting means 24.

Most of the operations during welding are the same as for the first example above, so that only different aspects will be described below. The third example has lesser arc noise and higher arc stability than the first example, thereby providing better operability.

Table 3 below shows exemplary data for MIG AC welding with a mild steel solid wire having a diameter of 0.9 mm, a shield gas of 100% Ar. Under these conditions favorable results were obtained as in the cases of Tables 1 and 2.

TABLE 3

| $I_{EP}$ [A] | $I_{ER}$ [A] | $I_{EN}$ [A] | $T_{EP}$ [ms] | $T_{ER}$ [ms] | $T_{EN}$ [ms] | Wire Feeding Rate [m/min] |
|---|---|---|---|---|---|---|
| 300 | 40 | 60 | 8 | 70 | 3 |  |
|  |  |  |  |  | 8 | 7.5 |
|  |  |  |  |  | 0.5 | 15 |

It is possible to set welding conditions in a unified way by providing a output level setting means 51 and a function generator 52 which instructs wire feeding rate, output voltage V, and period $T_{EN}$ in accordance with the level of the output of the output level setting means 51, as shown in FIG. 8.

In the third example current $I_{ER}$ is varied either linearly or in steps. The same result as obtained in this example may be used also in the first and the second examples by providing a period $T_{ER}$ setting means and a voltage setting means for setting a voltage during the period $T_{ER}$, and by varying the voltage linearly or in steps.

It would be understood that the constancy of the current or the voltage of the output of the output inverter 8 in the first and third example, respectively, may be substituted for constancy of voltage over the EP periods and constancy of current over the EN periods.

The consumable electrode gas shield arc welding according to the invention described above makes it possible to perform small current welding and synchronous transfer of the droplets formed at the wire tip to the molten pool with the period EP, since AC output is applied across the wire and the base metal in such a way that the positive period of the wire and output levels during the positive and negative periods are held constant while the period of negative wire is made shorter or longer depending on the increase or decrease in the wire feeding rate. Furthermore, the invention eliminates arc vanishing in a small current region and arc's rambling providing good operability and high quality welding.

Figure 13:
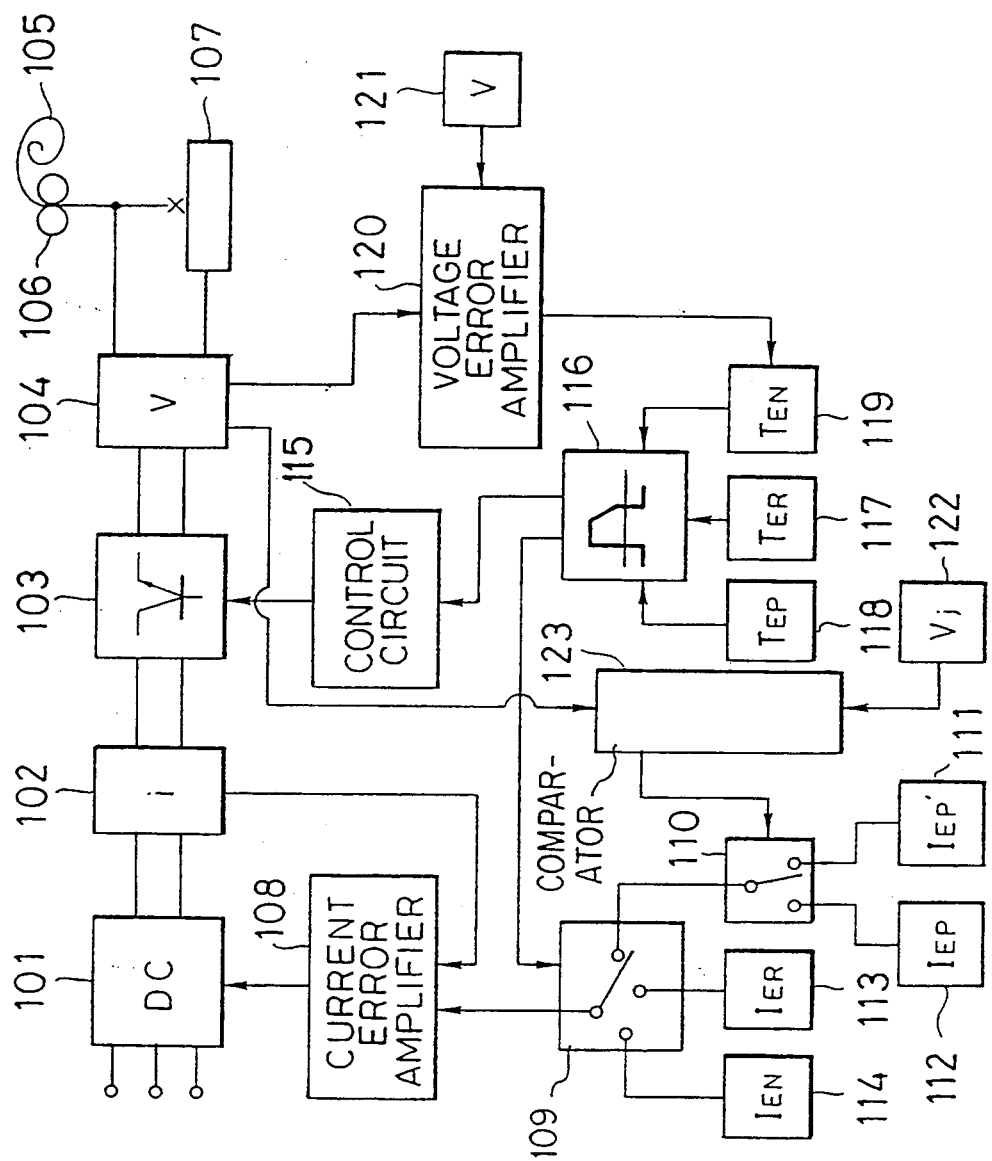
FIG. 13 is a block diagram of a fourth embodiment of the consumable electrode gas shield welding apparatus according to the invention.
Figure 14:
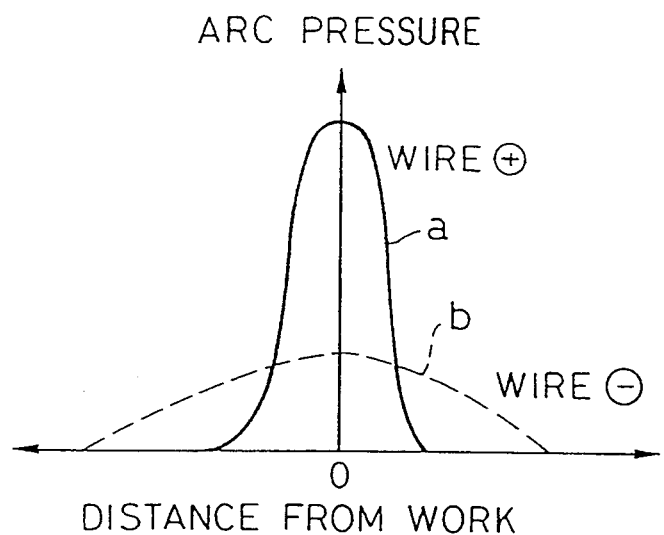
FIG. 14 illustrates the distribution of the arc pressure for the positive and negative wire polarities.
Figure 15:
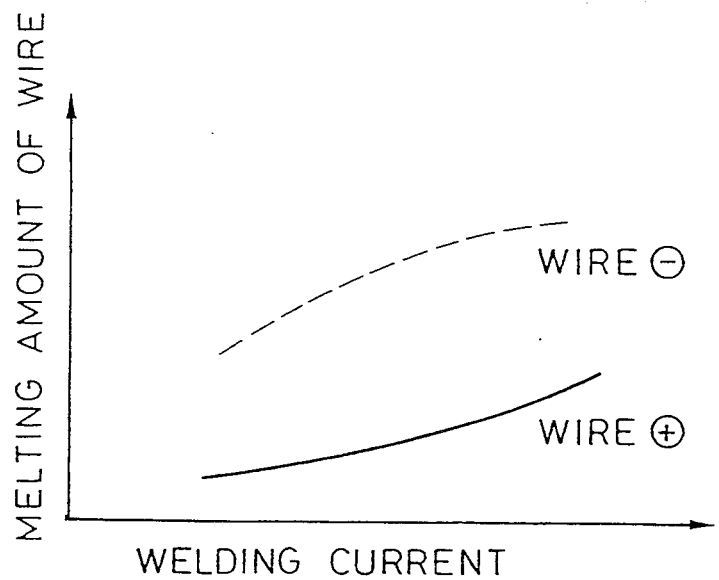
FIG. 15 illustrates the melting characteristic for the positive and negative wire polarities.

FIG. 13 is a block diagram of a consumable electrode AC gas shield arc welding apparatus according to the invention.

In this diagram a DC power source 101 having an input inverter circuit converts a commercial alternating current to a direct current; the DC output of the DC power source is provided via a current detector 102 to an output inverter 103 where the current is again converted to AC. The AC power output from the output inverter 103 is applied via a voltage detector 104 across a welding wire 105 serving as a consumable electrode and a basemetal 107 to be welded. The welding wire is fed by a wire feeding apparatus 106.

Figure 11:
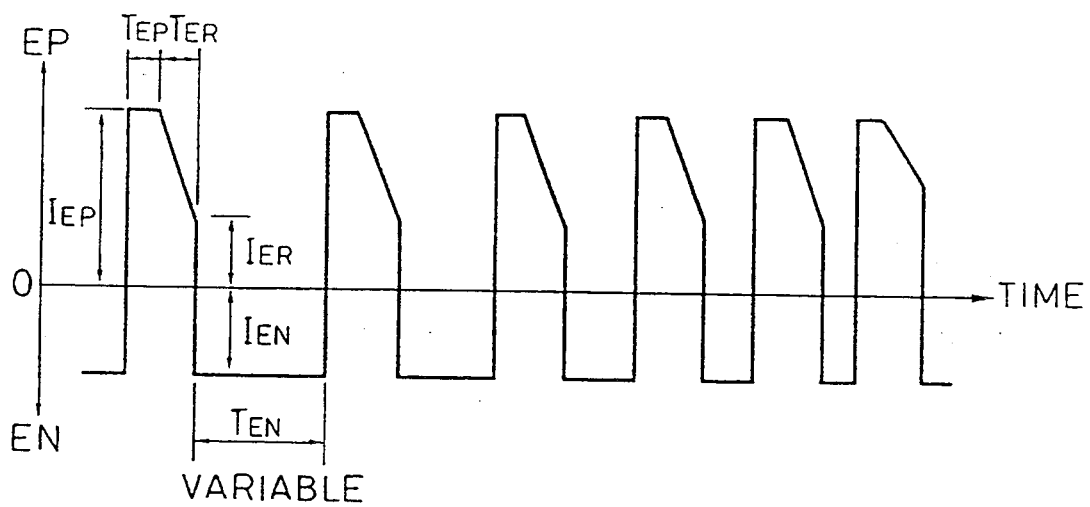
FIG. 11 shows an exemplary output characteristic of a consumable electrode gas shield arc welding method according to the invention.
Figure 12:
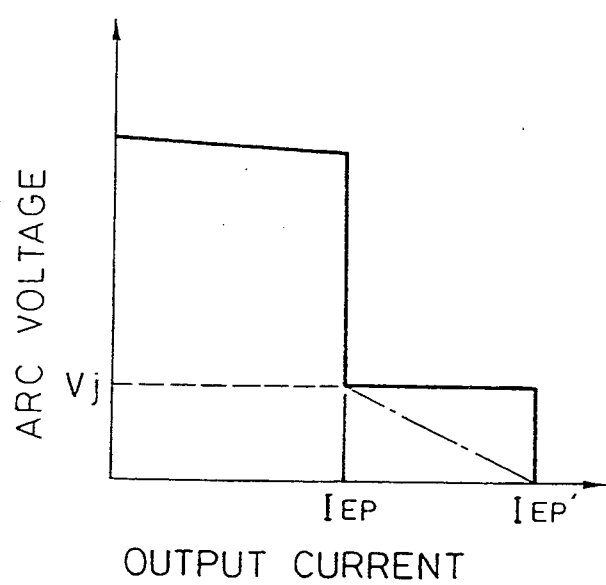
FIG. 12 shows the external characteristic used in the welding apparatus.

Current setting means 111, 112, 113 and 114 set the current levels $I_{EP}$, $I_{EP}$, $I_{ER}$ and $I_{EN}$ of the output of the current power source as shown in FIGS. 11 and 12. A comparator 123 compares the detected value v from tile voltage detector 104 with a reference value from a reference voltage $V_j$ setting means 122. A switch 110 connected with the current setting means 111 and 112 operates in response to the signal from the comparator 123 in such a way that then $V > V_j$ the current setting means 112 is selected for $I_{EP}$, and when $V < V_j$ the current setting means 111 is selected for $I_{EP'}$. A current selection circuit 109 sequentially selects the current $I_{EP'}$ or $I_{EP}$, $I_{ER}$ and $I_{EN}$.

Period setting means 117, 118 and 119 set the period, $T_{EP}$, $T_{ER}$ and $T_{EN}$ as shown in FIG. 11 respectively. Based on these periods a control circuit 116 instructs the current selection circuit 109 to select $I_{EP}$ during $I_{EP'}$ during $T_{EP}$; $I_{ER}$ during $T_{ER}$ subsequent to $T_{ER}$; and $I_{EN}$ during $T_{EN}$ subsequent to $T_{ER}$. A control circuit 116 further instructs a control circuit 115 connected with the output inverter circuit 103 to keep positive polarity of the wire 105 during $T_{EP}$ and $T_{ER}$, and negative polarity during $T_{EN}$.

A current error amplifier 108 controls the DC power source so that the output current of the DC power source 101 detected by the current detector 102 match the set current level selected by the selection circuit 109. On the other hand a voltage error amplifier 120 controls a $T_{EN}$ setting means 119 so that the voltage detected by voltage detector 104 across the wire 106 and the base metal 107 match the voltage level set by a voltage setting means 121.

Next, examples using the consumable electrode AC gas shield arc welding apparatus of the invention will be described.

Table 4 lists exemplary data for AC MIG welding using aluminum alloy wire (A5356) 1.2 mm in diameter and Ar shield gas.

TABLE 4

| $V_j$ [V] | $I_{EP}$ [A] | $I_{EP'}$ [A] | $I_{ER}$ [A] | $I_{EN}$ [A] | $T_{EP}$ [ms] | $T_{ER}$ [ms] |
|---|---|---|---|---|---|---|
| 5 | 220 | 600 | 100 | 50 | 4 | 2 |

Under the conditions specified in Table 4, favorable welding results were obtained with desirable arc configurations even in a case of butt welding of 1 mm thick aluminum alloys (A5083) by properly decreasing/increasing $T_{EN}$ in accordance with the wire feeding rate and arc voltage.

Table 5 lists exemplary data for Ar gas shielded mild steel MIG braze welding using copper wire 1.0 mm in diameter.

TABLE 5

| $V_j$ [V] | $I_{EP}$ [A] | $I_{EP'}$ [A] | $I_{ER}$ [A] | $I_{EN}$ [A] | $T_{EP}$ [ms] | $T_{ER}$ [ms] |
|---|---|---|---|---|---|---|
| 10 | 300 | 500 | 40 | 40 | 2 | 3 |

Arc configurations in this example are also favorable. Only little melting of the base metal, cracks and detaching of beads took place. In some cases arc voltages were set low (or $T_{EN}$'s were made large) to speed up welding and the short arc length was employed so as to have frequent short circuiting between the and the base metal. It was verified that the wire in contact with the base metal could be easily released owing to the increase in peak current to $I_{EP'}$, and that the instability of the arc for want of short circuiting current was prevented.

An example of a constant current control system is described in FIG. 13. An alternative and simpler constitution may be obtained by a so-called constant voltage control method in which: the control currents are replaced with control voltages; control of period $T_{EN}$ based on voltage detection feedback is omitted; and the arc current is varied in accordance with the set period $T_{EN}$.

It would be easily understood that the invention is not limited to nonferrous metals described above but also applies to ferrous materials as well.

The consumable electrode AC gas shield arc welding method and apparatus therefor according to the invention have aspects that a sequence of a first period through which the electrode is kept positive and the current is held at first level higher than a critical level is provided, a second period through which the electrode is kept positive but the current is reduced from said first level to a second level, and a period through which the electrode is kept negative electrode is repeated, and that, if the arc voltage falls below a predetermined level, a current higher than said first level is provided for welding until the arc voltage exceeds the predetermined level in the first period. Accordingly, the invention provides the following features.

(a) Penetration in the base metal may be smaller than in reverse polarity welding in which polarity of the electrode is always positive. And hence welding according to the invention permits easy welding of thin plates.

(b) Since the surface of the consumable electrode is subject to cleaning effect during the period of negative polarity, welding defects due to oxidation or stain of the surface of the consumable electrode is prevented, thereby improving welding performance.

(c) Noise arising from alternating current may be reduced a lower level than in rectangular AC welding, since the current during said second period of positive electrode is reduced.

(d) A greater melting efficiency of the consumable electrode may be obtained than conventional reverse polarity welding, due to increased melting rate of a consumable electrode during the period of negative electrode.

(e) Good MIG braze welding or build-up welding is possible due to reduced penetration in the base metal which reduces the rate of dilution of the welding metal.

Figure 18:
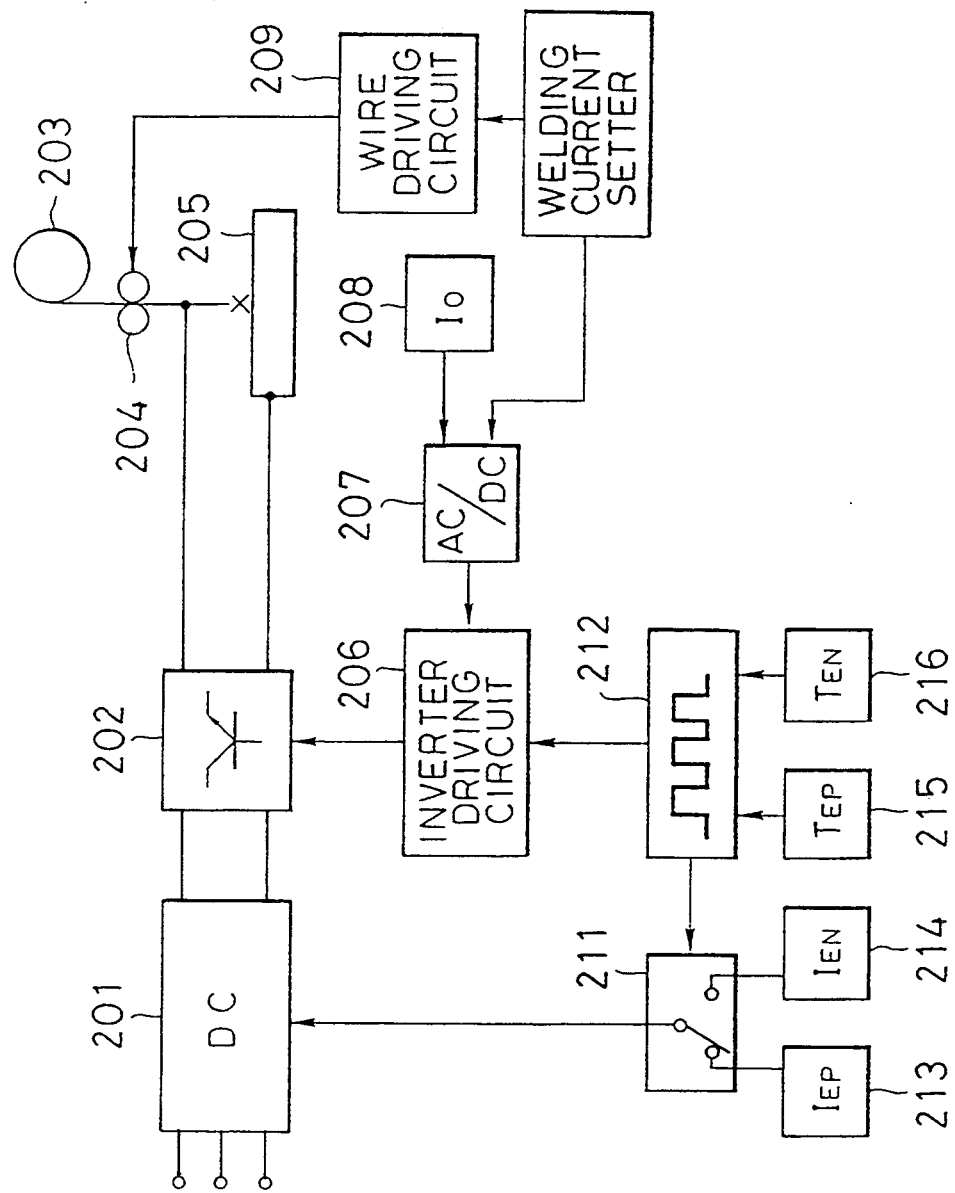
FIG. 18 is a block diagram illustrating the construction of a fifth embodiment of the consumable electrode AC-DC gas shield welding apparatus according to the invention.

FIG. 18 is a fifth example of the consumable electrode AC-DC gas shield arc welding apparatus according to the invention shown in a block diagram. In this figure, a DC power source 201 has an input inverter which converts commercial alternating current to hi-frequency AC. An output inverter 202 converts the output of the DC power source 201 to rectangular alternating current. A welding wire 203 fed by means of a wire feeding device 204 is supplied power from the output inverter 202 to weld a base metal 205.

Figure 20:
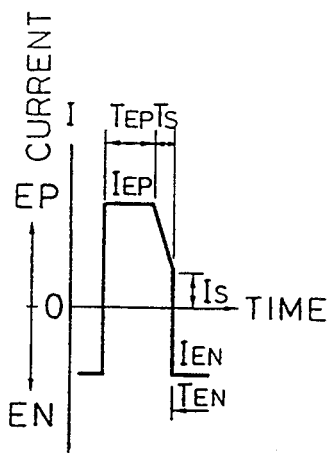
FIG. 20 illustrates a waveform usable with the embodiments of the invention.
Figure 21:
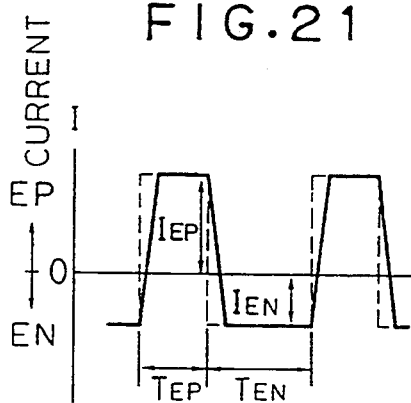
FIGS. 21 through 25 illustrate the modes prior art welding current.
Figure 22:
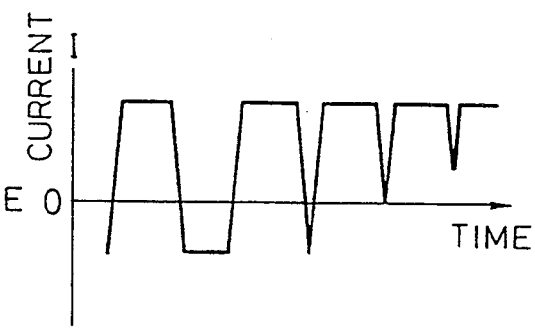
Figure 23:
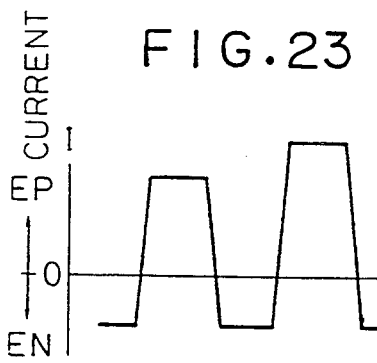
Figure 24:
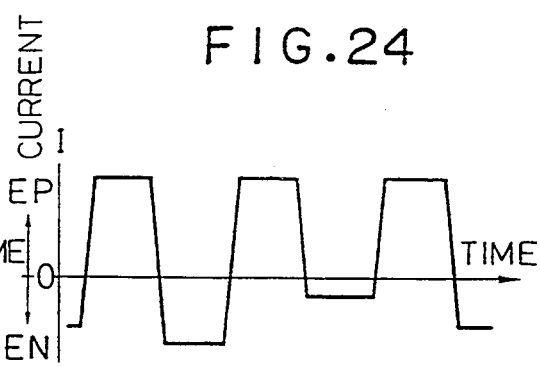
Figure 25:
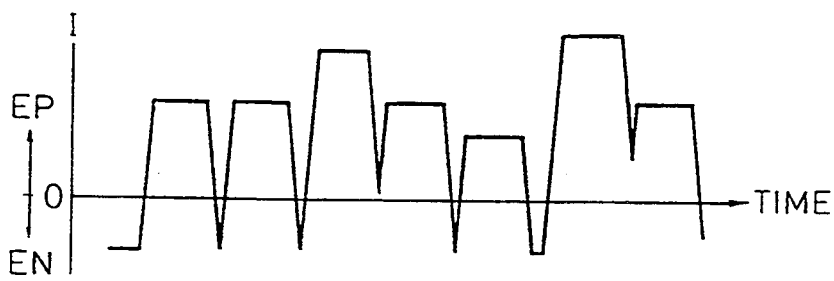

DC current setting means 213 and 214 set a current level $I_{EP}$ of reverse polarity (EP) and a current level $I_{EN}$ of straight polarity (EN) of the rectangular AC, respectively. Period setting means 215 and 216 set periods $T_{EP}$ and $T_{EN}$ for the level $I_{EP}$ and $I_{EN}$, respectively (FIG. 20). Polarity setting means 212 transmits signals to an inverter driving circuit 206 for driving the output inverter 202, and to a DC output switching means 211 for selecting one of the current settings means 213 and 214. The DC output switching means 211 switches the current setting means 213 to the current setting means 214 and vice versa so that set current is $I_{EP}$ during the $T_{EP}$ period and the set current is $I_{EN}$ during the $T_{EN}$ period.

A welding current setting means 210 generates signals instructing a wire driving circuit 209 for driving the wire feeding device 204, and discrimination signals to an AC/DC discriminator 207.

Figure 16:
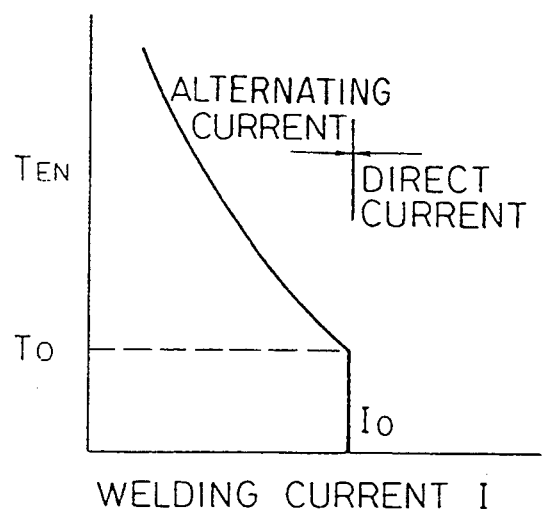
FIG. 16 illustrates I-$T_{EN}$ characteristic of a consumable electrode AC=DC gas shield arc welding apparatus according to the invention.
Figure 17:
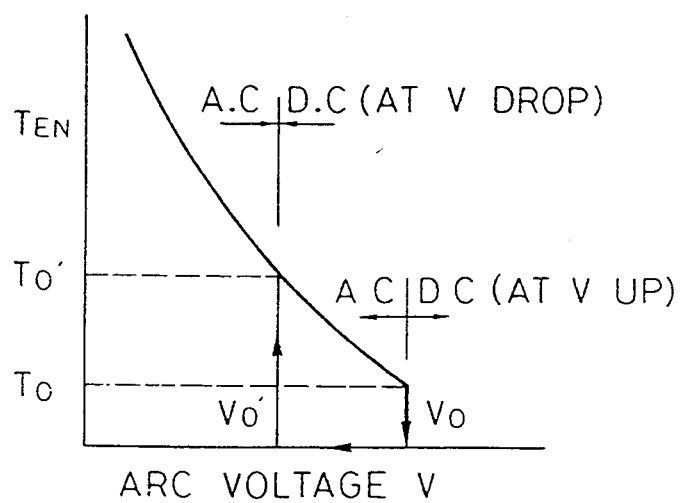
FIG. 17 illustrated V-$T_N$ characteristic of another consumable electrode AC-DC gas shield arc welding apparatus according to the invention.

The AC/DC discriminator 207 compares the output I of the welding current setting means 210 with the output of the AC/DC switching means 208 (i.e. operating current level Io) and instructs the output inverter driving circuit 206 to put AC power from the wire if I<Io, and DC power from the positive welding wire if I≦Io, as shown in FIG. 16. In other words even when a $T_{EN}$ signal of straight polarity (at which the welding wire is negative) is given from the polarity setting means 212, the output inverter driving circuit 206 drives the output inverter 202 so that reverse polarity (i.e. the welding wire being positive) is maintained and does not invert the polarity if a "DC" signal is given by AC/DC discriminator 207.

It is noted that if the AC/DC switching means 208 is constituted by a device capable of outputting Io at an arbitrary level, for example a volume control unit, the output current may be switched at arbitrary current level between AC and DC, and that DC welding is always possible by choosing Io at very low level.

Figure 19:
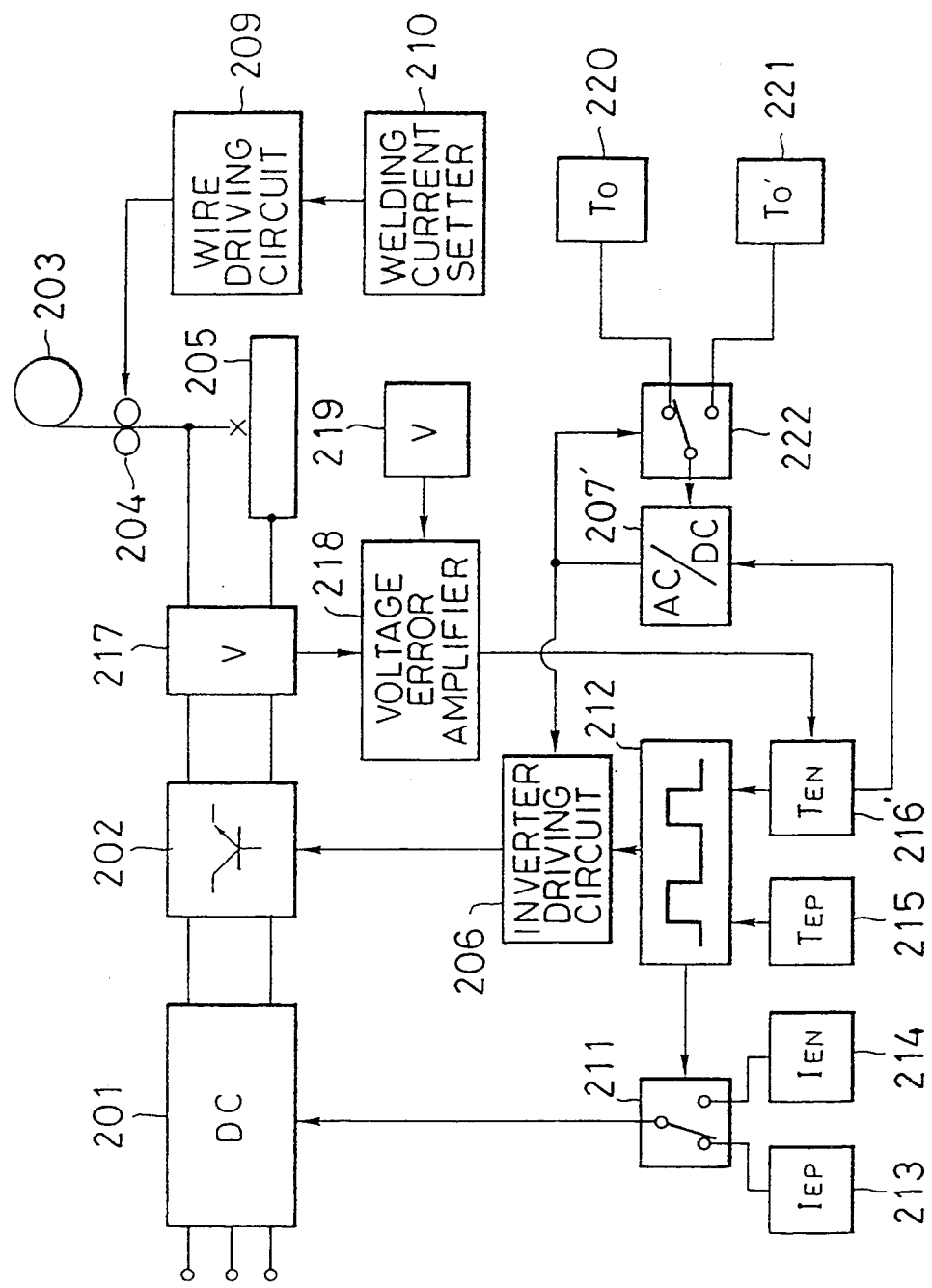
FIG. 19 is a block diagram illustrating the construction of another embodiment of the consumable electrode AC-DC gas shield welding apparatus according to the invention.

FIG. 19 is still another example of the invention. In the Figure those components having the same numerals as in FIG. 18 each have the same function as their counterparts, so that their detailed description will not be repeated here, except the following points that markedly differ in those two example.

A Voltage error amplifier 218 controls a period setting means 216' for setting $T_{EN}$ so as to match the output of an arc voltage detector 217 for detecting the arc voltage across the welding wire 203 and the base metal 205 with the value set by an arc voltage setting means 219.

AC/DC switching signal setting means 220 and 221 each set period To after which AC welding is switched to DC welding and period To' after which DC welding is switched to AC welding, respectively, as shown in FIG. 2.

A switching level setting means 222 selects AC/DC switching signal setting means 220 when AC welding is to be performed and the AC/DC switching signal setting means 221 when DC welding is to be performed. An AC/DC discriminator 207' compares the output of the period setting means 216' for setting a normal polarity period $T_{EN}$ with the output of a level switching means 222, to instruct the output inverter driving circuit 206 and the level switching means 222 to perform AC welding if $T_{EN}$>To (or To') but otherwise perform DC welding.

Since optimum values of period To and To' depend on manner of carrying out welding and material properties of the wire, they cannot be uniquely determined. In general, however, appropriate values of To and To'-To are several ms. However, in the case where the polarity of the wire is reversed after the current is lowered linearly or in steps from the lowest edge of $I_{EP}$ shown in FIG. 20, it is necessary to take account of time $T_{ER}$ for the current to decrease into To in order to obtain stability of the arc or arc noise reduction of at the time of alternation.

Although in the above example the output of the DC power source is a constant current, a constant voltage output may be employed without losing any advantages of the invention. For example, in FIG. 18 the current setting means 213 and 214 for $I_{EP}$ and $I_{EN}$ may be replaced with voltage setting means in the case of a constant voltage DC power source.

Two current setting means and two period setting means one for each of $I_{EP}$ and $I_{EN}$ may be provided along with the AC/DC discriminator for better output waveforms and levels of the welding current to thereby getting a better arc configuration in DC welding pulse arc welding.

Since the consumable electrode AC-DC gas shield arc welding apparatus according to the invention comprises:

a polarity inverter for outputting a high level current of reverse polarity and a lower level current of straight polarity;

a welding current control means for controlling the level of the welding current by varying said straight polarity period;

a polarity fixing means for fixing the polarity at which said polarity inverter operates, thereby permitting only DC welding if the normal polarity period becomes less than a predetermined length; the invention provides the following advantages.

(1) Mingling of AC and DC welding may be avoided even under variable working conditions, minimizing resultant welding defects or loss of operability.

(2) AC or DC welding may be arbitrarily chosen depending on the welding requirement, providing good welding operability. For example, when welding with shallow penetration and large amount melting is desirable, e.g. low current level welding on thin metal plates liable to melt down, AC welding may be chosen, but when deep penetration is required in thick plate welding or speedy welding of thin plates is required, reverse or speedy may be chosen.

(3) Since different threshold levels are prescribed for switching from AC to DC and from DC to AC mode of welding, AC welding tends to sustain AC mode and DC welding tends to sustain DC mode, avoiding arc instability caused by mingling of AC and DC welding.

Figure 26:
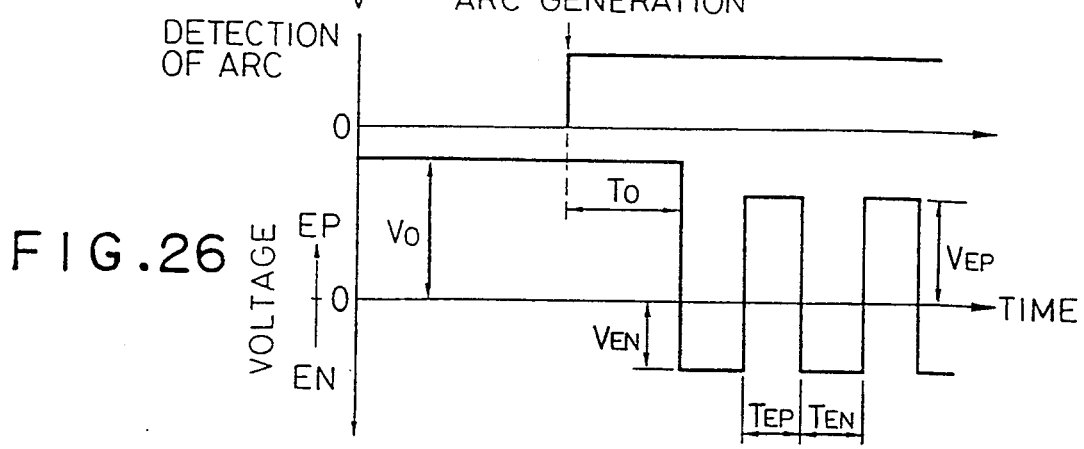
FIGS. 26, 27 and 28 each illustrate method of AC arc initiation embodying the invention.

FIG. 26 shows an example of arc initiation using a mild steel wire 1.2 mm in diameter, in which: the voltage across the wire and the base metal is set to be Vs at the beginning of the arc; $V_{EP}$ during the period $T_{EP}$ (with wire polarity being EP) and $V_{EN}$ during the period $T_{EN}$ (with wire polarity being EN) in a steady state subsequent to the initiation. Period Ts is the length of the initiation stage during which Vs is maintained. When $T_{EN}$ was varied approximately inversely to the wire feeding rate with $V_S=40$ V, $V_{EP}=30$ V, $V_{EN}=20$ V, $T_s=100$ ms, and $T_{EP}=4$ ms, favorable arc initiation and stable AC welding were obtained for any wire feeding rate.

Figure 27:
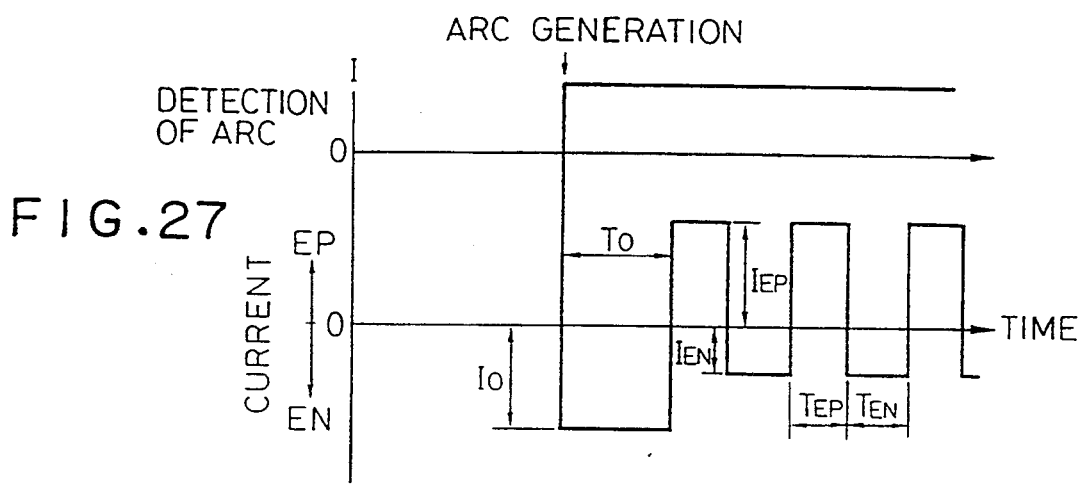

FIG. 27 shows an example of MIG braze welding using a wire of 1.0 mm in diameter containing copper as a major component. In this case, the level of the welding current is held to be $I_s$ over a period to in the arc initiation; $I_{EP}$ during the period $I_{EP}$ (with wire polarity being EP) and $I_{EN}$ during the period $I_{EN}$ (with wire polarity being EN) in a steady state subsequent to the ignition of the arc. To be specific, $I_s=300$ A, $I_{EP}=300$ A, $I_{EN}=50$ A, $T_{EP}=25$ ms; $T_s=50$ ms, and the period $T_{EN}$ for the EN polarity is varied. The choice of the parameters above is appropriate in suppressing greatly the melting of the base metal, especially during arc initiation where high output current is required, since in MIG braze welding it is necessary not to melt the base metal appreciably.

Figure 28:
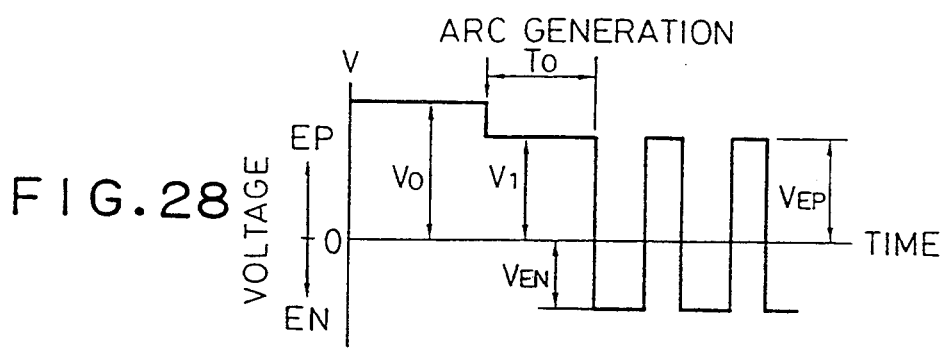

FIG. 28 shows an welding method suitable for use with thin wire or aluminum wire which are liable to burning. In this method To may be prolonged by setting the starting output voltage lower than the above mentioned voltage $V_s$ but above the welding voltage $V_{EP}$ to thereby improve arc initiation characteristics.

The invention shown in FIGS. 26 and 28 concerns with arc ignition for use with a constant voltage power source and in FIG. 27 concerns with the arc ignition for use with a constant current power source. It should be noted, however, that either ignition method is not limited to the characteristic of the power source in obtaining desirable arc ignition above.

In what follows an AC gas shield arc welding apparatus embodying the AC arc ignition according to the invention will be described.

Figure 29:
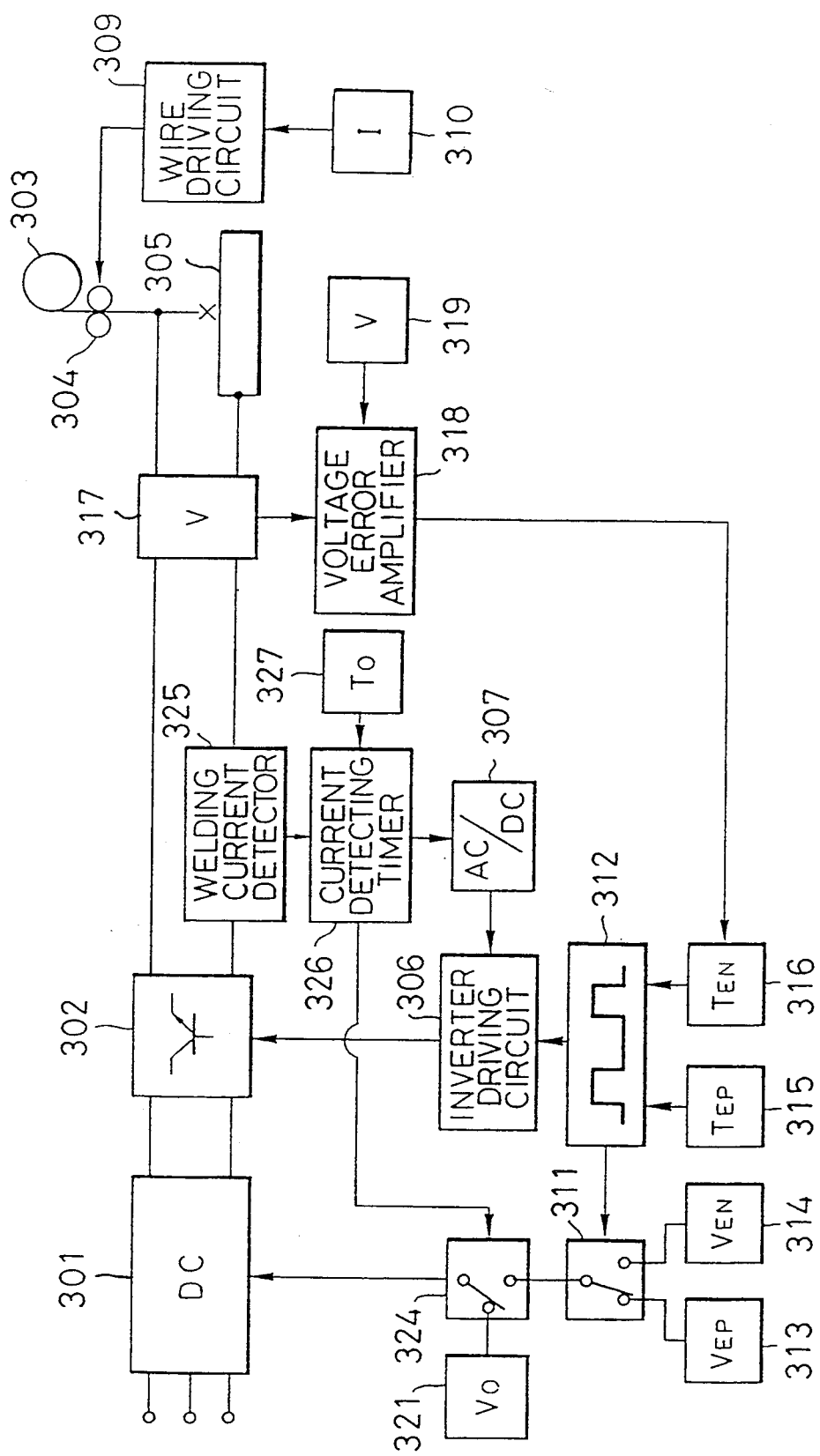

FIG. 29 is block diagram of the sixth gas shield arc welding apparatus employing the arc ignition method shown in FIG. 26. In this Figure an inverter 302 converts the output of a DC power source to AC power; a welding wire 303 fed by a wire feeding device 304 is provided with power from the inverter 302 and welds a base metal 305.

A voltage setting means 313 and 314 set output of the DC power source 301 at level $V_{EP}$ during the period of polarity EP of the wire, and at $V_{EN}$ during the period of polarity EN of the wire. Period setting means 315 and 316 set the period $T_{EP}$ for the level $V_{EP}$ and period $T_{EN}$ for the level $V_{EN}$, respectively. A polarity setting means 312 transmits $T_{EP}$ and $T_{EN}$ signals to an output switching means 311 for switching from one voltage setting means 314 to another and vice versa and to an inverter driving circuit 306 of the inverter 302. The output switching means 311 switches the voltage setting means 313 and 314 so that the voltage during the period $T_{EP}$ becomes $V_{EP}$, and the voltage during the period $T_{EN}$ becomes $V_{EN}$. A welding current setting means 310 instructs the wire driving circuit 309 to drive the wire feeding device 304. A voltage error amplifier 318 controls the period setting means 316 so as to match the output of the arc voltage detector 317 of the inverter 302 with the value set by the arc voltage setting device 319.

Upon starting an arc, and AC/DC switching signal generator 307 transmits signals to the inverter 302 instructing that the polarity of the welding wire 303 be polarity EP. At the same time the set value $V_s$ of the start-up output setting means 321 is applied across the welding wire 303 and the base metal 305 via start-up signal switching means 324, the DC power source 301, and the inverter 302. As the arc is established between the wire 303 and the base metal 305, a welding current detector 325 connected with the output of the inverter 302 detects the current, and a resultant detection signal causes a current detection timer 326 to operate, which timer in turn actuates the AC/DC switching signal generator 307 after period $T_s$ subsequent to the arc ignition as specified by a timer-time setting means 327 connected with the times 326. The AC/DC switching signal generator 307 generates AC operating signals for driving the driving circuit 306, and at the same time connects the output switching means 311 with the DC power source 301 by actuating the start-up switching means 324. Thus, a welding current may be provided as usual.

In order to use the AC arc ignition shown in FIG. 27 in the AC gas shield arc welding apparatus, it suffices to replace some of the components shown in FIG. 29. Namely, a current $I_s$ substitutes for the start-up voltage $V_s$ in the start-up output setting means 321; current setting means for the voltage setting means 313 and 314, to thereby setting a current level $I_{EP}$ for EP polarity and a level $I_{EN}$ for EN polarity. The rest of the components may be the same. Therefore, further explanation of the apparatus will not be repeated here.

FIG. 30 is a block diagram of a seventh AC gas shield arc welding apparatus using the AC arc ignition method shown in FIG. 28. In comparison with the apparatus shown in FIG. 29, the start-up output setting means 321 is replaced by an start-up output setting means 322 for setting voltage $V_1$ (which is lower than $V_s$ but higher than $V_{EP}$) instead of the start-up voltage $V_s$; a start-up output setting apparatus 321 is additionally provided for setting $V_s$; a set value switching means 323 for switching between the voltage $V_s$ and a voltage $V_1$; and the switch 323 is connected with welding current detector 325.

Since in the AC arc ignition according to the invention the output applied across the consumable electrode and the base metal is made greater than a normal output at the time of ignition of the arc and over an initiation period subsequent predetermined period, and the polarity of the wire is changed only after said predetermined period, smooth arc ignition may be obtained even in consumable electrode AC gas shield arc welding, along with good arc stability and hence improved operability.

Also in cases where melting of the base metal must be suppressed as in MIG braze welding, desirable arc initiation may be obtained by appropriately choosing EP polarity.

What is claimed is:

1. A consumable electrode gas shield AC arc welding method that applies AC power across the consumable electrode and a base metal, comprising steps of repeating periodically a sequence of a first period through which the electrode is kept positive and a current of a first level higher than a specified critical level is furnished, a second period through which the electrode is kept positive and a current of said first level is reduced to a second lower level, and a third period through which the electrode is kept negative and a current at a third level is furnished; and furnishing a current of fourth level higher than said first level until the arc voltage exceeds a predetermined level if the arc voltage between said consumable electrode and the base metal drops below the predetermined voltage during said first period.

2. A consumable electrode gas shield AC arc welding method according to claim 1 wherein said period through which the electrode is negative is reduced on one hand in correspondence with the increase in said set value of electrode feeding rate or of arc voltage, while on the other hand said period through which tile electrode is negative is increased in correspondence with the decrease in said set value.

3. A consumable electrode gas shield AC arc welding apparatus, comprising:
   a DC power source;
   an output setting means for setting the output current of said power source in at least four different levels, including a first higher current level than a specified critical level with the positive electrode, a second lower current level than the first with the positive electrode and a third current level with the negative electrode for generally periodically repeated three sequential periods, and a fourth higher current level than the first with the positive electrode for a period from an occasional detected time of a lower are voltage between the electrode and a base metal than a preset arc voltage in said period of the first current level until a recovered time when the detected arc voltage exceeds the preset arc voltage;
   a current control means connected to said output setting means, for controlling said DC power source;
   an inverter for inverting the output of said DC power source to AC power;
   duration period setting means for setting up said three sequential periods;
   a duration period control means with connections to said current control means and to said inverter, for periodically transmitting the duration period signals for said three sequential periods according to the signals from said period setting means;
   a voltage detection means for detecting the arc voltage between said consumable electrode and a base metal;
   a switching means for selectively switching said output current from said first level to said fourth level according to said detected arc voltage.

4. A consumable electrode AC-DC gas shield arc welding apparatus, comprising:
   a DC power source;
   a polarity switching means for supplying welding current to a welding wire as the consumable electrode from said DC power source connected thereto;
   an output current setting means for controlling said DC power source by selection of two current levels preset in two current reference setting means;
   an arc voltage detecting means for detecting the arc voltage between the electrode and a base metal;
   an arc voltage setting means for a reference;
   a duration period setting means for controlling respective polarity periods of said electrode with duration period references connected to said polarity switching means, the duration period including of a reversed polarity with a higher current level and of a straight polarity with a lower current level;
   a voltage error amplifier for regulating the value of the duration period reference of the straight polarity to square the detected value of said arc voltage detecting means with the value of said arc voltage setting means; and
   a polarity mode setting means for controlling said polarity switching means which changes the polarity mode from AC to DC when the regulated straight polarity duration period reaches to a preset value of a first AC/DC mode switching reference in the case of shortening the duration period, and from DC to AC when the straight polarity duration period reaches to a preset value of a second AC/DC mode switching reference in the case of prolonging the duration period.

* * * * *